Jan. 18, 1927.
H. S. HOLMES
AXLE HOUSING
Filed May 27, 1921
1,615,083
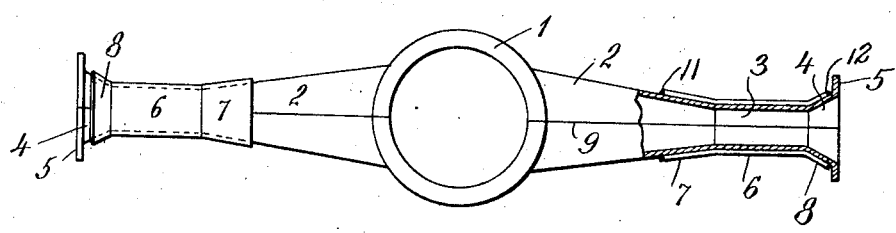
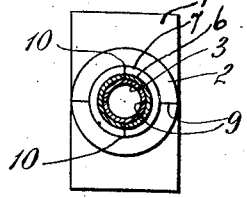
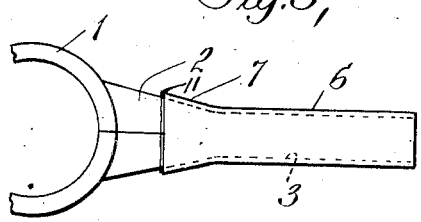
Inventor
Henry S. Holmes
By his Attorney Patented Jan. 18, 1927.

1,615,083

UNITED STATES PATENT OFFICE.

HENRY S. HOLMES, OF NEW YORK, N. Y., ASSIGNOR TO THOMAS E. MURRAY, OF BROOKLYN, NEW YORK.

AXLE HOUSING.

Application filed May 27, 1921. Serial No. 473,080.

My invention aims to provide an axle housing of the type used generally for the rear axles of motor vehicles. My improved axle housing is simple in construction and is reinforced so as to enable it, even though made of comparatively light metal, to withstand the strains of use.

The accompanying drawings illustrate embodiments of my invention.

Fig. 1 is an elevation, partly in section, of an axle housing with my improvement applied thereto;

Fig. 2 is a cross section of the same;

Fig. 3 is a side elevation of half of another type of housing with my improvement applied thereto.

Referring to the embodiments of the invention illustrated, the housing of Fig. 1 comprises a central enlarged portion 1 and symmetrical end portions, each comprising a flared portion 2 and an adjoining straight portion 3 and at its outer end a flared portion 4 with a transverse flange 5 for attachment to adjacent parts of the structure. The end portions are tubular and may be circular in cross-section as illustrated in Fig. 2 or may be of other cross-section.

In use, the principal strain on these housings is a torsional strain and the tendency to yield is greatest at the point where the cross-section changes, as from the straight portion 3 to the flared portions 2 and 4. I have observed in extended experiments, subjecting various shapes of housings to torsional strain, that they generally yield at such point. I provide, therefore, a simple and cheap reinforcement by applying a sleeve to the outside of the housing at such points and for a suitable distance each side thereof. Preferably also I extend the reinforcement over the entire straight portion of the housing because to stop the reinforcement at any point along such straight portion would be to provide a point of weakness where the reinforcement ceases.

According to Figs. 1 and 2 the reinforcement comprises a sleeve with a straight portion 6 extending over the straight portion 3 of the housing, with a flared portion 7 extending over the portion 2 of the housing to such a distance that beyond the reinforcement the portion 2 has a strength equal to the maximum required, and a flared portion 8 over the portion 4 of the housing to a similar distance. With such a reinforcement I have found that the strength of the housing is such that when subjected to the torsional strains it will yield first in the ring 1 which because of its size normally offers the maximum resistance.

The housing proper is preferably made of segments welded together along their longitudinal edges indicated by lines 9. The reinforcing sleeve is similarly made of segments welded together along longitudinal edges indicated at 10; these edges being placed preferably at an angle, as shown a right angle, from the edges 9 of the segments of the housing. Thus the weld of the housing segments is reinforced by the segments of the surrounding sleeve, which overlie the said welds. By this method of application of the reinforcement it can be easily and cheaply applied with a tight fit on the housing so as to effectually aid the latter in resisting torsional strains, as well as other strains.

Fig. 3 shows another style of axle, with a central enlargement 1, a flared portion 2 and a straight portion 3 extending to the end of the housing proper. In this design the reinforcing sleeve has a straight portion 6 extending over the full length of the straight portion, and a flared portion 7 extending over the flared portion of the housing for a distance beyond the straight portion, sufficient to ensure the desired strength.

I am aware that previous constructions have been used or proposed in which the end portions of the housings have been made in two parts, one overlapping the end of the other, and to this extent in a sense reinforcing it. But I know of no case in which the housing has extended continuously from the central enlargement to the outer ends and is adapted for direct attachment to the adjacent parts of a vehicle, in which such end portions, or the weaker points thereof, have been reinforced; nor any case in which a reinforcement has been applied to the outside of the end portions of axle housings.

After the reinforcement is in place I propose to arc weld it to the housing around each end, as indicated at 11 and 12. This is not essential but is advantageous in order to seal the joint between the housing and the reinforcement.

Therefore, though I have described with great particularity of detail certain specific embodiments of my invention, yet it is not to be understood therefrom that the invention is restricted to the particular embodiments disclosed. Various modifications thereof in detail and in the arrangement of the parts may be made by those skilled in the art without departure from the invention as defined in the following claims.

What I claim is:

1. An axle housing comprising a central enlargement and end portions comprising a straight portion and an adjacent flared portion and a reinforcement on the outside of said straight portion and the adjacent flared portion.

2. An axle housing comprising a central enlargement and end portions comprising a straight portion and flaring portions adjacent to the opposite ends of the straight portion, and a reinforcement extending continuously along said straight and said flaring portions.

3. An axle housing comprising a central enlargement and end portions comprising a straight portion and an adjacent flared portion and a reinforcement comprising a sleeve on the outside of said straight portion and said adjacent flared portion.

4. An axle housing comprising a central enlargement and end portions comprising a straight portion and an adjacent flared portion and a reinforcement comprising a sleeve on the outside of said straight portion and said adjacent flared portion said sleeve comprising segments welded together along their longitudinal edges.

5. An axle housing comprising a central enlargement and end portions comprising a straight portion and an adjacent flared portion, said housing comprising segments welded together along longitudinal edges and a reinforcement comprising a sleeve surrounding said straight portion and adjacent flared portion and comprising segments welded together along longitudinal edges placed at an angle from the edges of the segments of the housing.

6. An axle housing comprising a central enlargement and end portions, said housing comprising segments welded together along longitudinal edges, and reinforcements comprising sleeves surrounding said end portions and comprising segments welded together along longitudinal edges placed at an angle from the edges of the segments of the housing.

7. An axle housing comprising a central enlargement and tubular end portions integral therewith, the wall of each end portion comprising parts which extend in different longitudinal directions, said housing comprising segments extending its full length and welded together along longitudinal edges, and a separate reinforcement applied to each of said end portions extending continuously over the meeting point of the parts which extend in different directions and limited in length so as not to extend beyond the end portions.

In witness whereof, I have hereunto signed my name.

HENRY S. HOLMES.